(12) United States Patent
Saur et al.

(10) Patent No.: US 12,541,848 B2
(45) Date of Patent: Feb. 3, 2026

(54) METHOD FOR A MACHINE LEARNING SYSTEM FOR SURGERY ASSISTANCE

(71) Applicant: Carl Zeiss Meditec AG, Jena (DE)

(72) Inventors: Stefan Saur, Aalen (DE); Anna Alperovich, Aalen (DE); Alexander Freytag, Erfurt (DE)

(73) Assignee: Carl Zeiss Meditec AG, Jena (DE)

( * ) Notice: Subject to any disclaimer, the term of this patent is extended or adjusted under 35 U.S.C. 154(b) by 448 days.

(21) Appl. No.: 18/319,046

(22) Filed: May 17, 2023

(65) Prior Publication Data

US 2023/0377146 A1 Nov. 23, 2023

(30) Foreign Application Priority Data

May 20, 2022 (DE) .......................... 102022112731.1

(51) Int. Cl.
*G06K 9/00* (2022.01)
*A61B 34/10* (2016.01)
*G06T 7/00* (2017.01)

(52) U.S. Cl.
CPC ............ *G06T 7/0012* (2013.01); *A61B 34/10* (2016.02); *G06T 2207/20081* (2013.01); *G06T 2207/20084* (2013.01)

(58) Field of Classification Search
CPC ......... G06T 7/0012; G06T 2207/20081; G06T 2207/20084; G06T 2207/10024; G06T 2207/10056; G06T 2207/10064; G06T 2207/30096; A61B 34/10; A61B 90/20; A61B 2017/0092; A61B 2090/3612; G06V 2201/032; G06V 10/82; G06V 20/69; G16H 20/40; G16H 30/40; G16H 50/20; G16H 50/70; G06N 3/047; G06N 3/09; G06N 3/0455
See application file for complete search history.

(56) References Cited

FOREIGN PATENT DOCUMENTS

| CN | 112070660 A | * | 12/2020 | ............. G06N 3/045 |
|---|---|---|---|---|
| CN | 112070887 A | * | 12/2020 | ............. G06F 30/27 |
| CN | 110458813 B | * | 3/2021 | ........... G06V 10/806 |
| WO | WO-2020163845 A2 | * | 8/2020 | ......... A61F 9/00736 |

* cited by examiner

*Primary Examiner* — Xin Jia
(74) *Attorney, Agent, or Firm* — Honigman LLP; Brett A. Krueger

(57) ABSTRACT

A method for training and using a machine learning system for a differentiation between healthy and diseased tissue during a microsurgical intervention is described. In this case, the method comprises: receiving training data and associated annotation data for training a machine learning system, training the machine learning system, which after training is configured for a prediction of a probability value and a prediction of a trustworthiness value, from which a control signal for a surgery assistance system is derivable, which is usable during a later application during a microsurgical operation, and storing parameter values of the trained machine learning model.

15 Claims, 9 Drawing Sheets

102 Receiving at least one first set of training data in the form of digital images of tissue which were recorded by a microsurgical device

104 Training an ML system with the first set of training data in order to generate a machine learning model which after having been trained is configured for a prediction of a probability value as to whether or where a diseased tissue region is present a prediction of a trustworthiness value ... of the ML model

106 Storing parameter values of the trained machine learning model

FIG. 1

METHOD FOR A MACHINE LEARNING SYSTEM FOR SURGERY ASSISTANCE

CROSS-REFERENCE TO RELATED APPLICATIONS

This application claims priority of German Patent Application No. 10 2022 112 731.1 filed May 20, 2022, the contents of which are incorporated herein.

TECHNICAL FIELD

The disclosure relates to a computer-implemented method for training a machine learning system, and to put it more precisely to a computer-implemented method which trains a machine learning system for a differentiation between healthy and diseased tissue during a microsurgical intervention. Moreover, the disclosure relates to a method for a differentiation between healthy and diseased tissue during a microsurgical intervention by means of a trained machine learning system during productive operation. Furthermore, the disclosure relates to a training system for training a machine learning system for a differentiation between healthy and diseased tissue, and to a corresponding surgery assistance system, and also to a computer program product.

BACKGROUND

In the case of complicated operations, for example neurosurgery or operations on the brain (for example tumor removal) or the spinal column, use is increasingly being made of robotic assistance systems and assistance functions, for example for surgical microscopes. As a rule, these require a kind of context understanding of the surgical scenes, ideally on the basis of recorded image data from a camera. One of the important operations in the context mentioned above is removal of tumors. However, during the operation it is very difficult for the surgeon to decide how much tissue they actually need to remove in order to ensure in the longer term that the tumor has definitely been removed. On the other hand, however, the intention is also to ensure that not too much tissue is removed, in order to avoid cognitive impairments, for example.

During such an operation the tumorous/diseased tissue should be removed as completely and precisely as possible in order firstly to prevent the tumor from growing into healthy tissue again, and, secondly, in order to retain as much healthy tissue as possible. The operations practically always take place in operating rooms and are carried out by a surgeon assisted by specialized equipment—for example a surgical microscope and/or a confocal endomicroscope.

Under normal visible white light, the outer boundaries of tumorous tissue are hardly recognizable through a surgical microscope. Therefore, there is the risk, of course, of too much or too little tumorous tissue being removed. These are suboptimal surgery results in both cases.

It is true that there are known solutions that enable better recognizability of the tumorous tissue. However, these solutions are almost entirely based on temporally shifted staining of a sample of the purportedly tumorous tissue. Occasionally projects have also been described in which machine learning systems were used and which are intended to help to interpret images which were recorded by a surgical microscope or the like. In most cases, however, the uncertainties in regard to the recognition of the tumorous tissue are still relatively high. Although machine learning systems can classify individual regions of an image of a tumor, it is nevertheless always left to the surgeon's discretion to what extent he relies on the assistance of the machine learning system. The fundamental question here is whether the surgeon can actually rely on the respective system at all.

Consequently, there is thus a need to address the inadequacies of the existing solutions, in particular to ensure that the surgeon who uses a surgery assistance system also acquires information about the actual reliability of the information and images presented to and used by the surgeon when carrying out the operation.

SUMMARY

This object is achieved by means of the methods proposed here, the corresponding systems and the associated computer program product as per the independent claims. Further embodiments are described by the respective dependent claims.

According to one aspect of the present disclosure, a computer-implemented method for training a machine learning system for a differentiation between healthy and diseased tissue during a microsurgical intervention is presented. In this case, the method comprises receiving at least one first set of training data in the form of digital images of tissue which were recorded by a microsurgical device—e.g. an associated image recording system —, together with associated annotation data for training a machine learning system, wherein the annotation data comprise information about an incidence of disease in each of the digital images.

The method furthermore comprises training the machine learning system with the at least first set of training data in order to generate a machine learning model which after training is configured for a prediction of a probability value indicative of whether a diseased tissue region is present in at least one segment of a received digital image, and for a prediction of a trustworthiness value indicative of a trustworthiness of the machine learning model, from which a control signal for a surgery assistance system is derivable, which is usable during a later application during a microsurgical operation.

Finally, the method also comprises storing parameter values of the trained machine learning model.

According to another aspect of the present disclosure, a computer-implemented method for a differentiation between healthy and diseased tissue during a microsurgical intervention is presented. In this case, the method comprises: (i) receiving a digital image from a microsurgical device, wherein the digital image represents tissue, (ii) predicting, by means of a trained machine learning system, a probability value indicative of whether a diseased tissue region is present in at least one segment of the received digital image, and (iii) predicting, by means of the trained machine learning system, a trustworthiness value indicative of a trustworthiness of the prediction of the probability value.

The method additionally comprises determining a control signal for a control system of a surgery assistance system which is usable during a microsurgical operation, wherein the control signal is ascertainable by means of the trustworthiness value. In this case, the machine learning system is trained with at least one first set of training data in the form of digital images of tissue which were recorded by a microsurgical device, together with associated annotation data, wherein the annotation data comprise information about an incidence of disease in each of the digital images. In this case, the training of the machine learning system generates a machine learning model comprising associated parameter values for a prediction of a probability value indicative of whether a diseased tissue region is present in at least one segment of a received digital image, and a prediction of a trustworthiness value indicative of a trustworthiness of the machine learning model, from which a control signal for a control system of a surgery assistance system is derivable, which is usable during an application during a microsurgical operation.

According to a further aspect of the present disclosure, a training system for training a machine learning system for a differentiation between healthy and diseased tissue during a microsurgical intervention is presented. This system comprises a memory for at least one first set of training data in the form of digital images of tissue which were recorded by a microsurgical device—e.g. by means of an image recording system —, together with associated annotation data for training a machine learning system. In this case, the annotation data comprise information about an incidence of disease in each of the digital images.

The training system additionally comprises a machine learning system, which is trainable with the at least first set of training data in order to generate a machine learning model, and also a processor and a memory operatively connected to the processor, wherein the memory stores instructions that cause the processor to do the following: train the machine learning system with the at least first set of training data in order to generate a machine learning model which after training is configured for a prediction of a probability value indicative of whether a diseased tissue region is present in at least one segment of a received digital image, and for a prediction of a trustworthiness value indicative of a trustworthiness of the machine learning model, from which a control signal for a surgery assistance system is derivable, which is usable during a later application during a microsurgical operation.

Finally, the training system comprises a memory for storing parameter values of the trained machine learning model.

According to a supplementary aspect of the present disclosure, a surgery assistance system for a differentiation between healthy and diseased tissue during a microsurgical intervention is presented. In this case, the surgery assistance system comprises the following: an image recording system of a microsurgical device for recording a digital image, wherein the digital image represents tissue, and a trained machine learning system comprising a machine learning model which is adapted for predicting a probability value indicative of whether a diseased tissue region is present in at least one segment of the recorded digital image.

In this case, the machine learning system having the machine learning model is also adapted for predicting a trustworthiness value indicative of a trustworthiness of the prediction of the probability value.

In addition, the surgery assistance system is also equipped with a control signal generator for a surgery assistance system which is usable during a microsurgical operation, wherein the control signal is ascertainable by means of the trustworthiness value, or on the basis thereof.

In this case, the machine learning system was trained with at least one first set of training data in the form of digital images of tissue together with associated annotation data, which were recorded by a microsurgical device. The information also contain annotation data about an incidence of disease in each of the digital images; and the training of the machine learning system generates a machine learning model and associated parameter values for a prediction of a probability value indicative of whether a diseased tissue region is present in at least one segment of a received digital image, and a prediction of a trustworthiness value indicative of a trustworthiness of the machine learning model, from which a control signal for a control system of a surgery assistance system is derivable, which is usable during an application during a microsurgical operation.

The proposed computer-implemented method for training a machine learning system for a differentiation between healthy and diseased tissue during a microsurgical intervention has a number of advantages and technical effects, which may also apply to the associated system, respectively:

In the case of previous surgery assistance systems, in particular those based on a machine learning system and on an interpretation of digital images from a surgical microscope, the situation that could keep on happening was that surgeons relied too much on the presented image representations of the machine learning systems, without knowing how well the respective systems can be trusted. This includes a system-inherent uncertainty factor, which can also be expressed as a trustworthiness value.

This is exactly the problem addressed by the methods and the corresponding systems presented here. This is achieved by the fact that a trustworthiness value for the trained and used machine learning system can also be predicted or generated together with other prediction values of the machine learning system. Such a trustworthiness value can be generated either for the entire represented image or else segment by segment. In this way it becomes possible to provide even better assistance for the surgeon who is carrying out a microsurgical operation and must concentrate completely on that. Not only is the surgeon presented with a probability of the presence of part of a tumor (pixel by pixel, segment by segment, or over the entire image) by means of a specific color coding which can be superimposed on the recorded digital image, but additionally the surgeon can also be presented with a trustworthiness map as a superimposition (or juxtaposition). A similar or additional superimposition can also be effected by means of a textual indication or a numerical indication (e.g. percentages of the trustworthiness value for the entire image, or the like).

The proposed methods and systems permit various possibilities in this respect: The trustworthiness map or uncertainty maps (trust map/uncertainty map) or inserted values can be presented in a manner overlapping other predicted digital images; regions or segments of the digital image can also be masked out. This could be expedient for the regions in which the trustworthiness values lie below a predefined threshold value. A further alternative would be a text overlay of the classification result (i.e., regarding the probability values) or of some other warning indication in the recorded digital image. Another possibility is an overlapping bar chart representation in individual regions of the digital image in respect of how it was recorded or how it was predicted. Overall, however, all the representation possibilities allow rapid comprehension by the surgeon. This, too, would increase the certainty during surgery by virtue of an improved interaction possibility (better machine-human interface). An acoustic warning signal or a voice output of a warning message can also contribute to this.

Therefore, the entire interaction with the apparatuses used (surgery assistance system, microsurgical device or other auxiliary apparatus) is significantly improved and the surgeon's appraisal during surgery regarding how and where they ought to guide the instruments can be assisted again on account of more certain data. Overall, the additional equipment certainty would significantly increase the certainty during operations. At the same time the surgery risk for the patient can be significantly reduced.

Both better assistance and decision-making during surgery for a surgeon and a possibility of better interaction—in particular with regard to the graphical user interface—with the existing systems are thus afforded. Moreover, it is possible to generate a control signal for a control system for a direct influence on the surgery assistance system, some other microsurgical device or some other auxiliary apparatus, such as e.g. a lighting system.

Furthermore, it is possible to insert—also as a superimposition—additional representations of the surgery events, such as, for example, a predicted BLUE400 representation (which can be predicted from a white light recording by means of a machine learning system, for example) or some other fluorescence representation. The latter could also be achieved by means of the machine learning system—in particular the same one that also predicts the probability values and the trustworthiness values. This would only require corresponding training of the machine learning system and the associated training data. A major advantage of such a solution would be that additional overhead or additional computationally intensive procedures with corresponding powerful computers would not be needed. A small additional outlay during the training of the machine learning system might possibly be required, but that would be made up for many times over. Since the trustworthiness values can also be determined pixel by pixel, a trustworthiness value map having the same dimensions as the actually predicted image or the probability values predicted pixel by pixel would arise as well. Instead of the trustworthiness value map, it is also possible, of course, to determine an aggregate scalar value for an entire region or the entire image.

Further exemplary embodiments are presented below, which can have validity both in association with the presented methods and in association with the corresponding systems.

In accordance with one advantageous embodiment of the method, the at least first set of digital images comprises a plurality of at least partly different sets of training data, from which a plurality of machine learning models are generated and/or stored by way of the training. In this case, individual images, including the associated annotation data, can be present both in one set and in another set of digital images. In other words, the training data sets need not be completely disjoint. In this way, with the aid of the different training data sets, it is possible to generate a plurality of machine learning models which will exhibit slightly different behaviors—i.e., different prediction values for the same input values—during productive use. The principle of ensemble learning can be realized as a result. The probability value and the trustworthiness value can then be ascertained on this basis.

On the basis just mentioned and in accordance with a further advantageous embodiment of the method, the latter additionally comprises, for the training of the machine learning system with the at least first set of digital images, retraining the machine learning system with the at least first set of digital images, wherein hyperparameter values of the machine learning system (e.g. initialization parameter values of the machine learning model)—or else associated training parameters or training environment parameters (e.g. feedback loop parameter values, a parameterization of the learning curve, a batch size of the training data)—differ between the original training and the retraining, as a result of which a plurality of machine learning models are generated and/or stored. Exactly these then form the basis for the determination of the probability value(s) and the trustworthiness value(s) during productive operation.

For this purpose and in accordance with another embodiment of the method, the prediction of the trustworthiness value can comprise generating a plurality of probability values for the presence of a diseased tissue region by means of the plurality of machine learning models. With the use of a plurality of machine learning models, the latter can be used for the purpose of ensemble learning. On the basis thereof, one exemplary embodiment can also comprise determining a function value for a function comprising the plurality of probability values as argument, wherein the trustworthiness value is based on the function value. One possibility for predicting the trustworthiness of a prediction of the probability of the presence of diseased tissue in at least partial regions of the digital recording resides in ascertaining the mathematical variance of the plurality of predicted probability values.

Exactly this procedure is described by the following exemplary embodiment: Accordingly, at least one of the methods already mentioned can comprise determining a variance value by way of the function constituted by the plurality of probability values, wherein the variance value represents the trustworthiness value. In this way, the principle of ensemble learning mentioned above makes it possible, both, to predict the presence of a tumor—at least in parts of the digital image—with greater accuracy and, secondly, to obtain an indication about the trustworthiness of the prediction made in regard to the presence of tumor-containing tissue.

In accordance with one supplementary embodiment of the method, the machine learning system can be a neural network. Various kinds of neural networks are conceivable for this, for example inverted neural networks, variational auto-encoders, machine learning systems having U-net architectures, etc. are usable.

In accordance with one beneficial embodiment of the method, the digital images of tissue can be recorded by means of an image recording system of a surgical microscope, of a confocal endomicroscope or of a micro-inspection tool. That covers practically all image recording devices that are technically expedient at present in the context of microsurgical interventions. The image recording systems used here do not have to be identical for all exemplary systems. One or more camera systems are typically used in a surgical microscope. By contrast, a confocal endomicroscope is more likely to involve an image detection unit on the basis of a laser scanner. Surgical microscopes that can be used can render color recordings, for example, while a confocal endomicroscope is more likely to yield digital images with grayscale levels. Moreover, the recording system of a micro-inspection tool is also suited to capturing not only central but also angular or slanted image regions.

In accordance with another elegant embodiment of one of the methods already presented, the machine learning system can comprise a plurality of trained machine learning models. As already outlined briefly above, probability values and also trustworthiness values can be elegantly determined or ascertained by way of the different prediction behavior of the different learning models.

In accordance with a further elegant embodiment, in the case of at least one of the methods presented—in particular the method for productive use—the control signal for a surgery assistance system can be at least one of the following:

a visual warning signal for a trustworthiness value that is lower than a first threshold value, an acoustic warning signal for a trustworthiness value that is lower than a second threshold value, a control signal for changing a system state of the surgery assistance system, and a control signal for initiating a changed recording mode for the digital image. This can comprise, for example, a change in the recording parameters for the digital recordings.

In this regard, for example, a high-resolution recording mode requiring possibly longer exposure times as well and possibly a plurality of camera channels as well can be selected; or better illumination of the recording region can be ensured. For this purpose, for example, both the image recording system, the camera and the lighting system can be brought geometrically to a different position and/or the intensity thereof can be changed.

That could also be accompanied by changing the image recording angle in order, if appropriate, to reduce an influence of disturbance variables—for example disturbing reflections, etc. Furthermore, it is possible to change from a left surgical microscope camera to a right surgical microscope camera (or vice versa)—or in principle to a different camera. As an alternative thereto, a robotic auxiliary system could also easily be manipulated by the control system. Frequencies and sensitivity values can be adapted in the case of an image scanner as image recording system (e.g. in the case of an endomicroscope).

The abovementioned first threshold value and the second threshold value can also have the same values. If an uncertainty value for the respective prediction is expressed by the trustworthiness value, the respective signal should be implemented upon a predefined uncertainty value being exceeded—in order to ensure the same behavior of the system.

Furthermore, upon the predefined trustworthiness value being undershot, the use, in particular the representation of the results in graphical form, can be prevented (e.g. switched off) in order not to mislead the surgeon into nevertheless using these results. In addition, it is possible to repeat the respective image recording and classification—i.e., the determination of the probability value for tumor recognition and the associated trustworthiness value—in order in this way to counteract errors or other particular situations during the recording.

Supplementarily, it is possible to change the system state of the surgery assistance system upon the predefined trustworthiness value being undershot. For example, the virtually generated fluorescence image (e.g. BLUE400) can continue to be displayed on the basis of white light images until the uncertainty of the prediction is too high. In this case, the method or the associated system can propose either changing to the traditional fluorescence mode or automatically performing the switchover.

Supplementarily, the results present up until that time (digital images, and associated prediction results, i.e., tumor prediction and trustworthiness) could also be forwarded to a further expert for separate assessment. This additional expert need not necessarily be a member of the surgical team, but rather can also access the available results from a remote location.

Furthermore, embodiments can relate to corresponding computer program products able to be accessed from a computer-usable or computer-readable medium that comprises program code for use by, or in conjunction with, a computer or other instruction processing systems. In the context of this description, a computer-usable or computer-readable medium can be any device that is suitable for storing, communicating, transferring, or transporting the program code.

BRIEF DESCRIPTION OF THE DRAWINGS

It is pointed out that exemplary embodiments of the disclosure may be described with reference to different implementation categories. In particular, some exemplary embodiments are described with reference to a method, whereas other exemplary embodiments may be described in the context of corresponding devices. Regardless of this, it is possible for a person skilled in the art to identify and to combine possible combinations of the features of the method and also possible combinations of features with the corresponding system from the description above and below—if not specified otherwise—even if these belong to different claim categories.

Aspects already described above and additional aspects of the present disclosure will become apparent inter alia from the exemplary embodiments described and from the additional further specific configurations described with reference to the figures.

Preferred exemplary embodiments of the present disclosure are described by way of example and with reference to the following figures:

FIG. 1 illustrates a flowchart-like illustration of one exemplary embodiment of the computer-implemented method according to the disclosure for training a machine learning system for a differentiation between healthy and diseased tissue during a microsurgical intervention.

Figure 2:
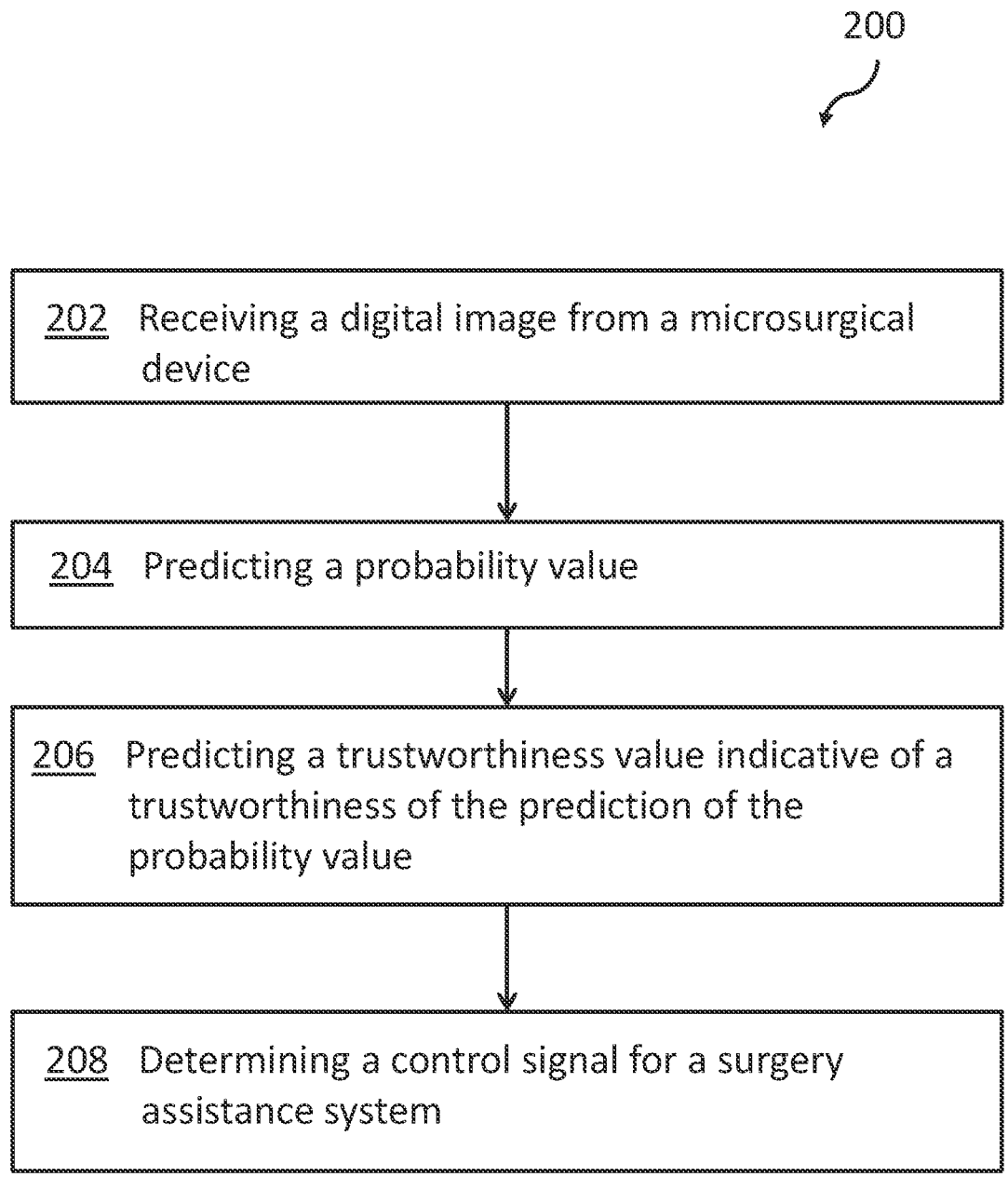

FIG. 2 shows a flowchart-like illustration of one exemplary embodiment of the computer-implemented method for a differentiation between healthy and diseased tissue during a microsurgical intervention.

Figure 3:
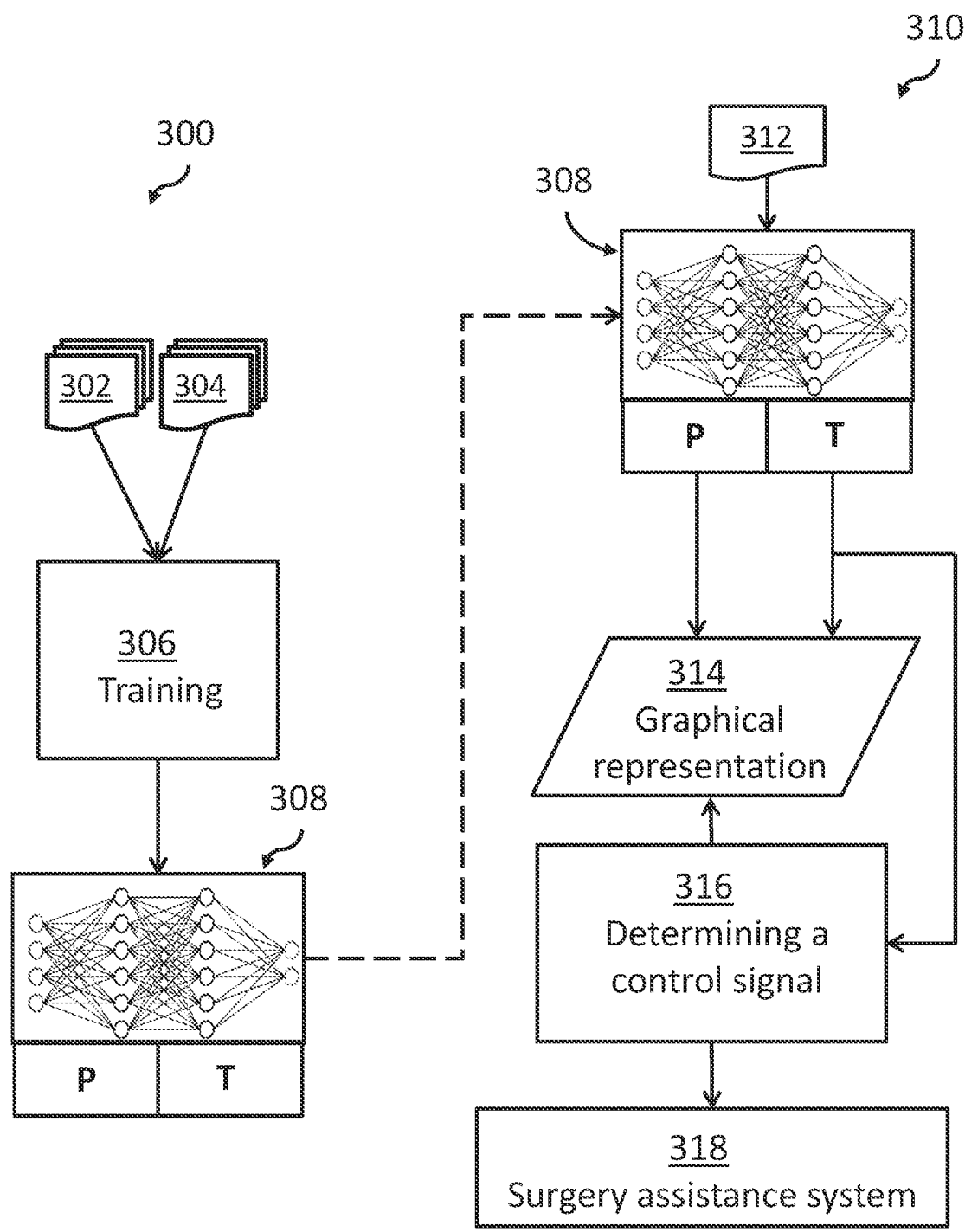

FIG. 3 shows one exemplary embodiment of a transition of the trained machine learning model/s from the training mode to a productive prediction mode.

Figure 4:
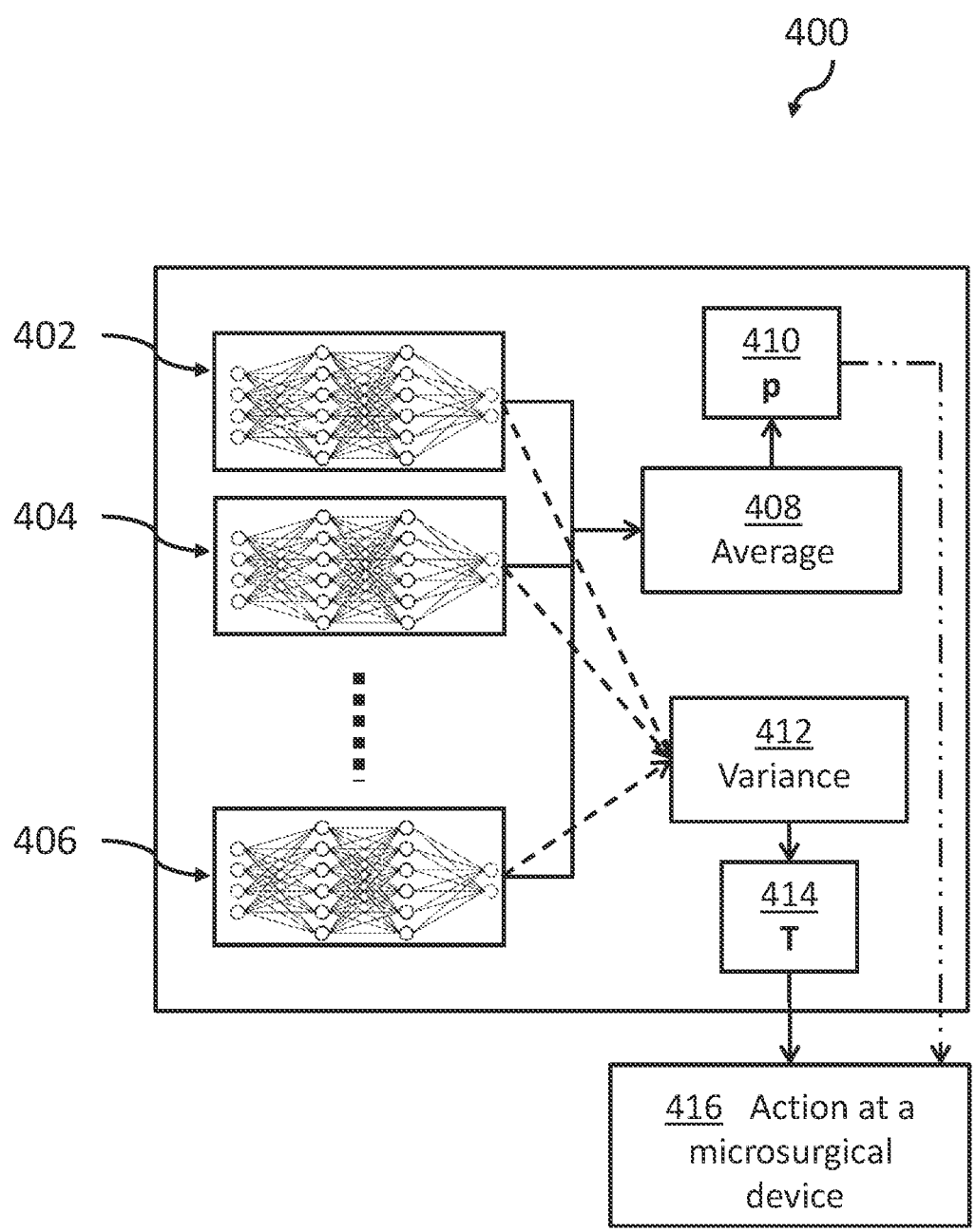

FIG. 4 shows a possible set-up of the machine learning system having a plurality of machine learning models.

Figure 5:
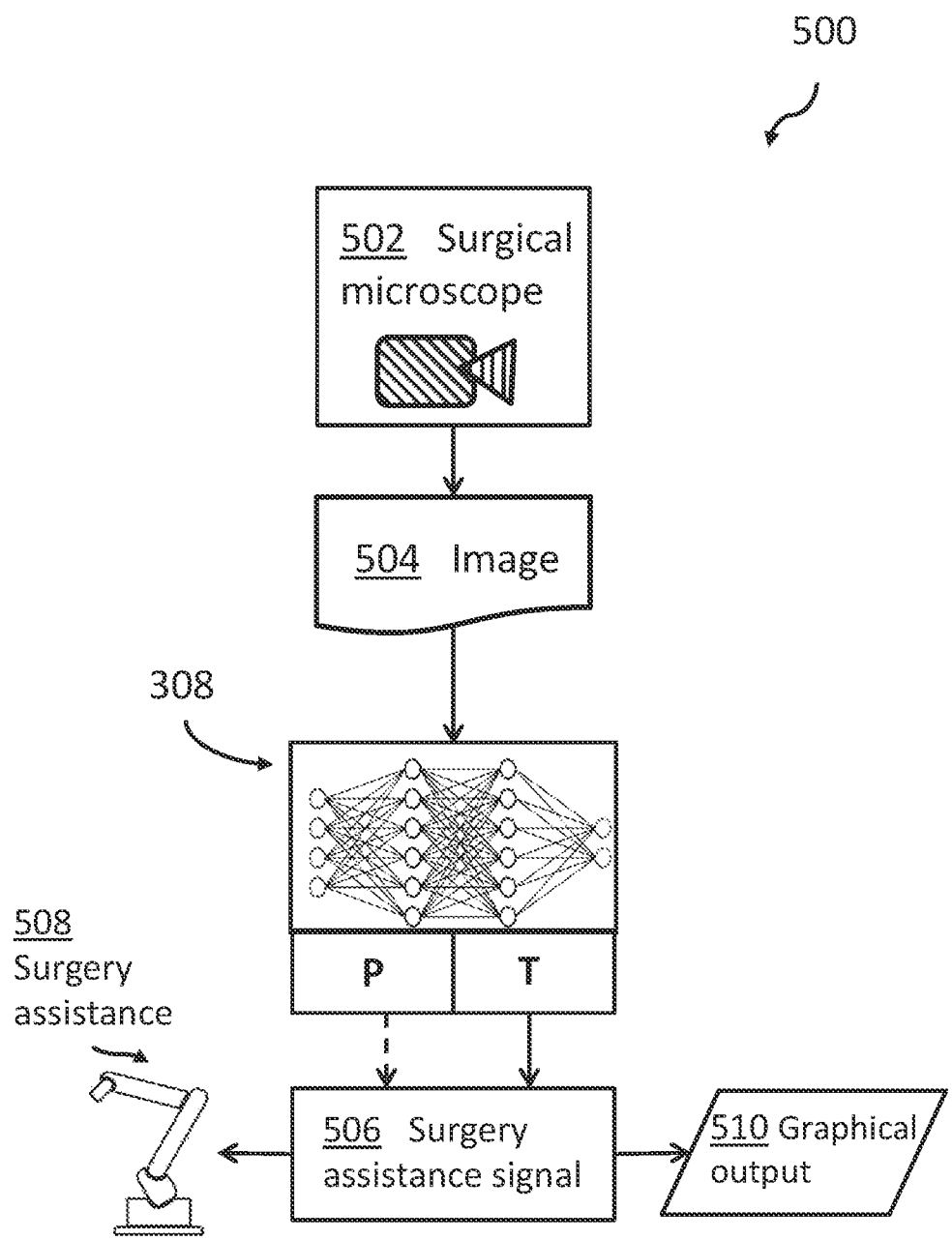

FIG. 5 shows one exemplary embodiment of a generic use scenario for a surgery assistance system.

Figure 6:
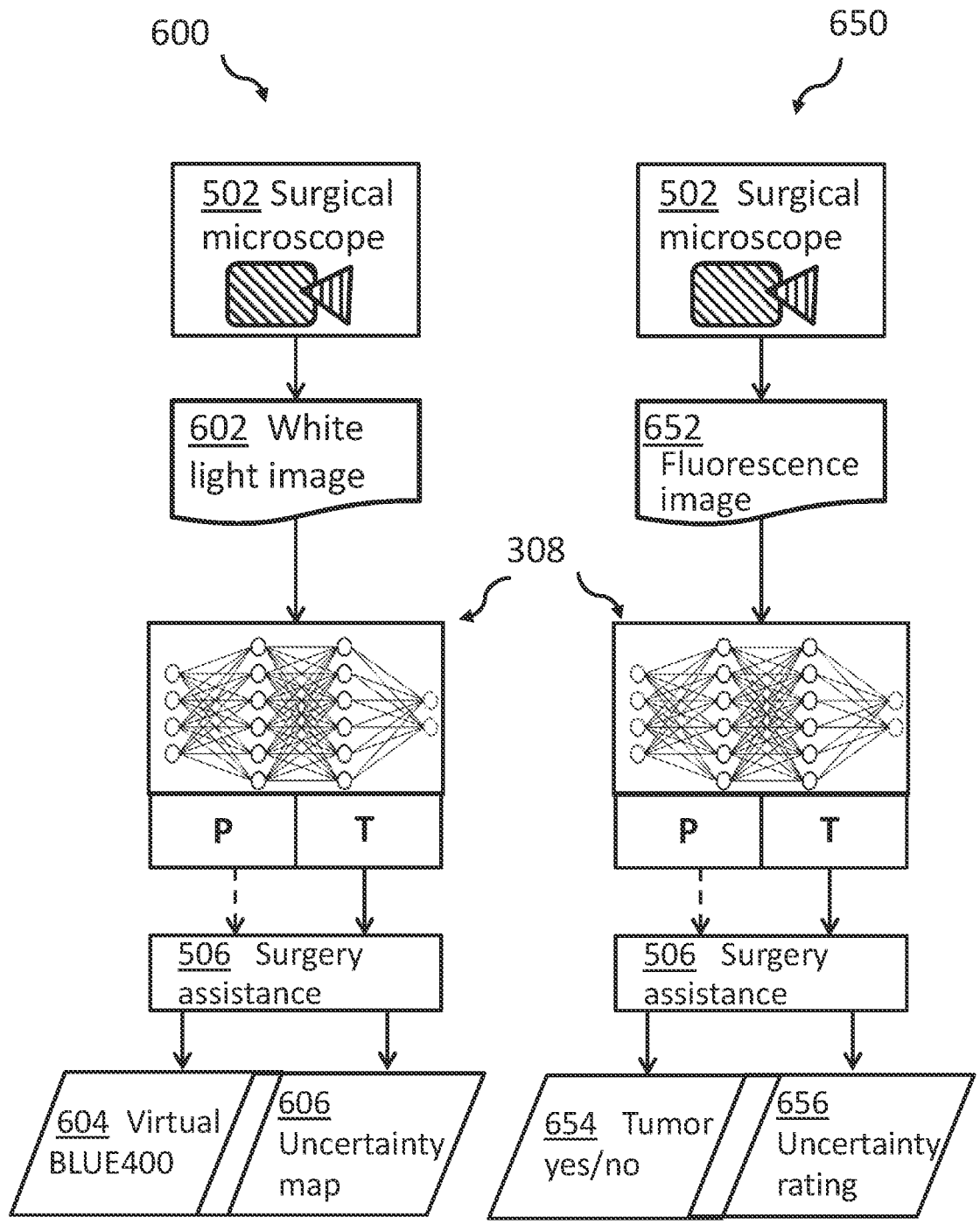

FIG. 6 shows different practical implementations on the basis of two different exemplary embodiments.

Figure 7:
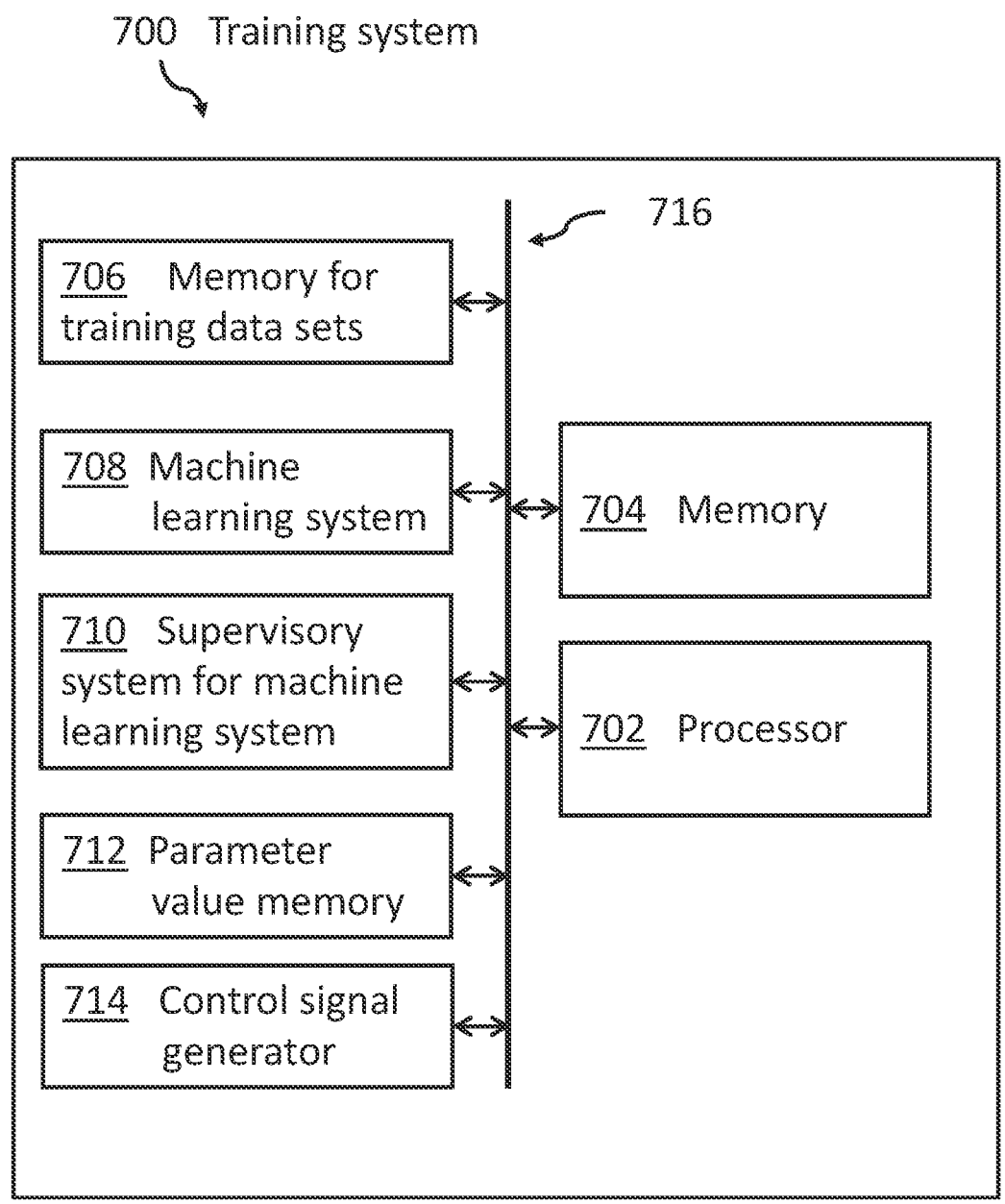

FIG. 7 shows one exemplary embodiment of the training system for training a machine learning system for a differentiation between healthy and diseased tissue during a microsurgical intervention.

Figure 8:
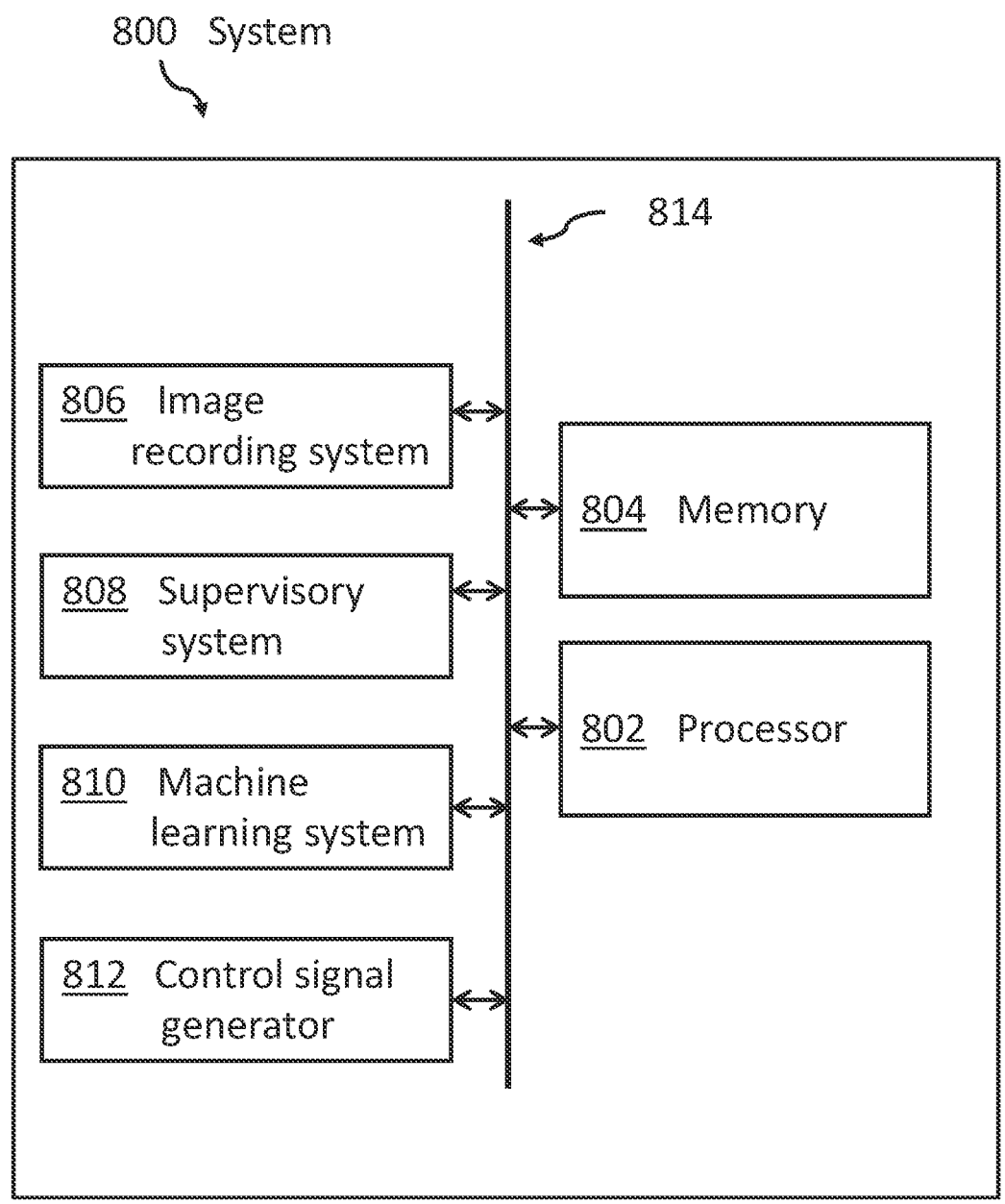

FIG. 8 shows one exemplary embodiment of parts of the surgery assistance system having a machine learning system for a differentiation between healthy and diseased tissue during a microsurgical intervention.

Figure 9:
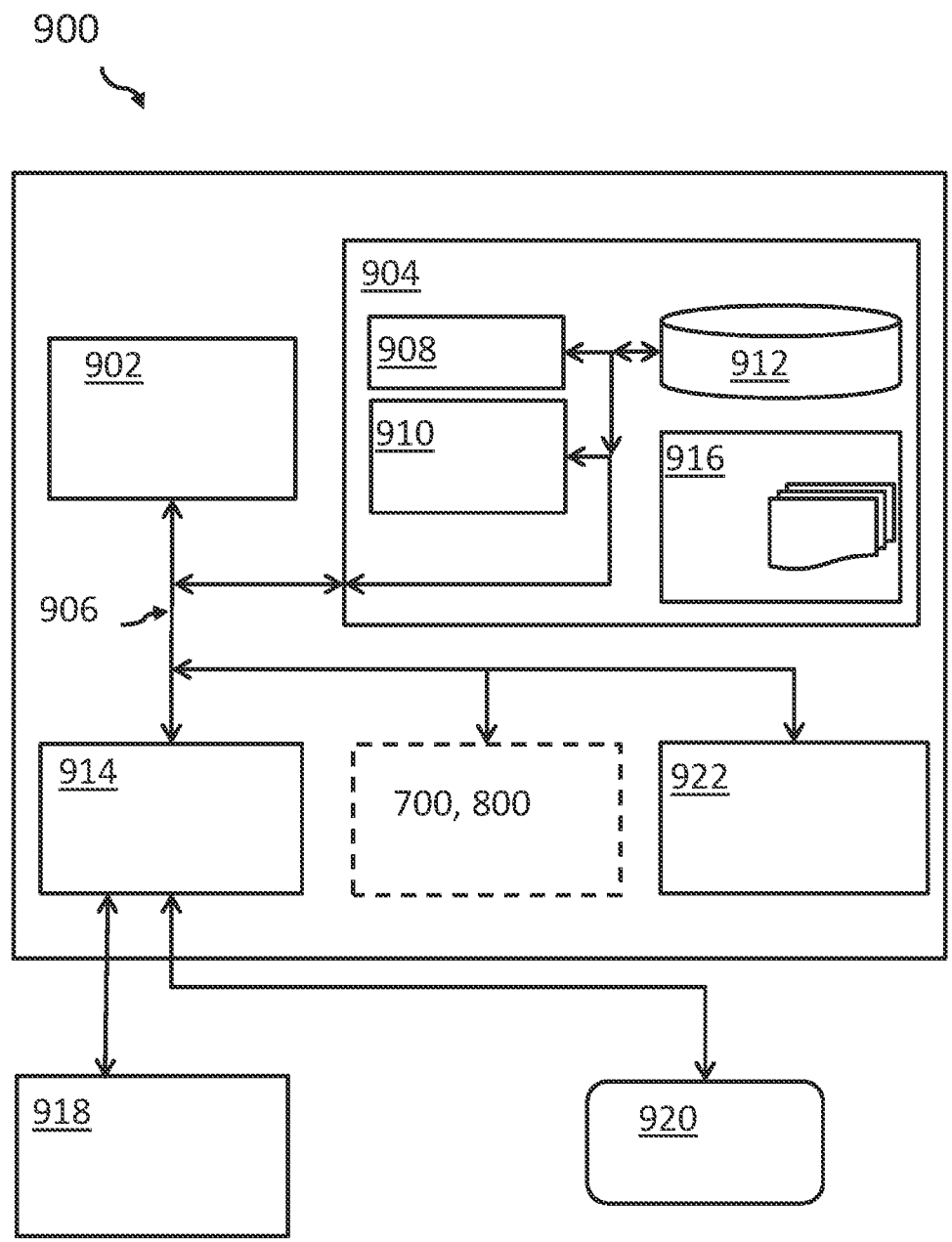

FIG. 9 illustrates one exemplary embodiment of a computer system which can comprise the system according to FIG. 7 or 8.

DETAILED DESCRIPTION OF PREFERRED EMBODIMENTS

In the context of this description, conventions, terms and/or expressions should be understood as follows:

The term "machine learning system" here may describe a system or else a method which is used to generate output values in a non-procedurally programmed manner. For this purpose, in the case of supervised learning, a machine learning model that is present in the machine learning system but untrained is trained with training data and associated desired output values (annotated data or ground truth data). The training phase may be followed by the productive phase, i.e., the prediction phase, while the output values are generated/predicted from previously unknown input values in a non-procedural manner. A large number of different architectures for machine learning systems are known to the person skilled in the art. They include neural networks, too, which can be trained and used as a classifier, for example. During the training phase, the desired output values given predefined input values are typically learned by means of a method called "backpropagation", wherein parameter values of nodes of the neural network or connections, or more precisely the weight factors thereof, between the nodes are automatically adapted by the training data. In this way the machine learning model inherently present is adjusted or trained in order to form the trained machine learning system with the trained machine learning model.

Moreover, it is possible for the one machine learning model to consist of a plurality of machine learning models which can be trained slightly differently by (slightly) different training data and, as a result, will generate slightly different prediction values during productive operation—i.e., the prediction phase. The different training data can be treated as different sets of training data. The training data of the different sets can be identical in part. That is to say that there may also be overlaps among the training data from set to set. Moreover, different predictions can also be generated by virtue of the conditions being different during the training of the respective machine learning model, such that different learning models are generated in this way. For example, this is possible by way of different backpropagation parameters.

The term "prediction" typically describes an output of the trained machine learning system in the productive phase of the machine learning system. During the prediction phase of the machine learning system, output values are generated or predicted on the basis of the respective trained machine learning model, to which previously unknown input data are made available. Different types of data or data classes are generated depending on the type of machine learning system—e.g. classifier system, regression system, etc.

The term "ground truth" or ground truth data describes the expected output data of a machine learning system that are fed to a machine learning system in the training phase besides the actual input data in order to adapt or optimize parameter values of the machine learning system—for example nodes and their interconnections in the case of a neural network. These ground truth data can also be referred to as annotation or metadata that are assigned to the respective original training data—usually in pairs. Consequently, the training data consist of a quantity of pairs of input data and expected output data, i.e., annotations or ground truth data.

The term "parameter values" of a machine learning system can be categorized in two categories, in principle: (i) the values describing the actual machine learning model associated with a predefined machine learning system having a predefined architecture; and (ii) the values describing the architecture of the machine learning system and also the circumstances, settings, conditions during the training phase. Consequently, a machine learning model is describable by an architecture and a set of parameter values. The architecture of a machine model can be implemented both in software and in hardware and in a combination thereof.

The term "microsurgical intervention" describes a surgical treatment that can be carried out on a large number of organs or tissues of the human body. What is typical of a microsurgical intervention is that the manipulated structures are so small that a surgical microscope or other magnifying optical systems must be used.

The term "segment", in particular "segment of a received digital image", describes a portion from the digital image. That can be a pixel, an associated group of adjacent pixels, or even the entire image.

Here and in connection with predictions of a machine learning system, the term "probability value" describes the probability with which a categorization—or classification—applies to a prediction of a machine learning model. One example would be: "Segment A of the received digital image shows a tumor disease with a probability of 85%."

In connection with the present document, the term "trustworthiness value" describes a numerical value which can give an indication about an inaccuracy of predictions of the underlying machine learning system. The trustworthiness value may concern the entire machine learning system or else individual regions or segments in which predictions are made. It is thus possible to divide a received digital image into a plurality of regions in which different trustworthiness values prevail (i.e., in the form of an "uncertainty map"). The term trustworthiness value should be clearly distinguished from the term prediction probability for a specific element within a received digital image. One possibility for generating a trustworthiness value consists for example in using a plurality of trained machine learning models, which differ slightly from one another, within the machine learning system. A trustworthiness value can be determined from the nature of the deviations between the predictions.

The term "variance" here describes the known term from descriptive statistics as a measure of the dispersion of numerical values around their mean. The statistic can also be interpreted as the mean squared deviation of the values. An ascertained variance value can be used as a measure of the trustworthiness value. Predictions of the machine learning system on the basis of different machine learning models which have a comparatively high dispersion would thus be classified as less trustworthy and would thus have a comparatively lower trustworthiness value.

The term "control signal" describes for example an electrical signal having a different strength depending on the ascertained trustworthiness value. The signal can have both an analog and a digital character. It can be used to directly affect subsystems of a surgery assistance system or of some other auxiliary system.

A detailed description of the figures is given below. It is understood in this case that all of the details and information in the figures are illustrated schematically. Flowchart-like illustrations of exemplary embodiments of the computer-implemented methods according to the disclosure—i.e., training and productive use/prediction phase—for a differentiation between healthy and diseased tissue during a microsurgical intervention are explained first. Further exemplary embodiments or exemplary embodiments for the corresponding systems are described subsequently:

FIG. 1 illustrates a flowchart-like illustration of one preferred exemplary embodiment of the computer-implemented method 100 for training a machine learning system for a differentiation between healthy and diseased tissue during a microsurgical intervention. The method comprises receiving, 102, at least one first set of training data in the form of e.g. clinical digital images of tissue together with associated annotation data, which were recorded by a microsurgical device. The images and the associated annotation data are used for training a machine learning system. The annotation data contain at least information about an incidence of disease in each of the digital images. This can involve the overall image—i.e., "tumor present"; equally, however, a pixel-by-pixel or segment-by-segment annotation within the image is also possible, i.e., the annotation "tumor present" or "no tumor" can be present for each pixel of the image or selected regions. It is also possible to use probability values for the attribute "tumor present". These probability values can range from ZERO ("no tumor") to 100% ("tumor definitely present").

The system for recording the digital image can involve color cameras of a surgical microscope—including having more than 3 color channels —, endoscopic systems (e.g. a confocal endomicroscope), which typically only yield grayscale range images by means of a laser scanner, or else a camera of a micro-inspection tool.

The annotation data can be assumed to be typical ground truth data within the meaning of machine learning.

The method furthermore comprises training, 104, the machine learning system with the at least first set of training data in order to generate a machine learning model. The machine learning model after training is thus configured for a prediction—or generation or else determination—of a probability value. The latter is indicative of the fact that a diseased, e.g. tumor-containing, tissue region is present in at least one segment—which may also be one pixel or concerns the entire image—of a received digital image. By way of example, an annotation value can comprise the following information: "There is an 85% probability that diseased tissue is present" (from pixel level through to image level). The prediction is thus firstly trained as accuracy of the individual prediction (accuracy of prediction) and output in the prediction phase.

Furthermore, the machine learning system having the trained machine learning model is adapted or trained to make (i.e., output) a prediction of a trustworthiness value. The latter is indicative of a trustworthiness ("trustworthiness of the network") of the machine learning model.

From this trustworthiness value—possibly in combination with the probability value—a control signal for a surgery assistance system can then be derived, which is usable during a later application during a microsurgical operation.

Finally, the method 100 also comprises storing, 106, parameter values—in particular actual parameter values and hyperparameter values—of the or the plurality of trained machine learning model/s. In this case, the parameter values can concern both the actual parameter values of the neural network (e.g., trigger values of the nodes), but also architectural data (e.g. number of nodes per level, number of levels of nodes, existing connections between levels or the nodes thereof, . . . ) and specific training parameters, i.e., overall hyperparameters.

FIG. 2 shows a flowchart-like illustration of one exemplary embodiment of the computer-implemented method 200 for a differentiation between healthy and diseased tissue during a microsurgical intervention. After the training phase according to claim 1, therefore, here the productive phase—i.e., the prediction phase—is now considered in more specific detail.

This method 200 comprises receiving, 202, a digital image from a microsurgical device, wherein the digital image represents tissue. The method also comprises predicting, 204—by means of a trained machine learning system —, a probability value indicative of whether a diseased tissue region is present in at least one segment of the received digital image. Furthermore, the method 200 also comprises predicting, 206—also by means of the trained machine learning system —, a trustworthiness value indicative of a trustworthiness of the prediction of the probability value. The trustworthiness value can relate to individual regions of the digital image and have different values in said regions, or else to the entire image. It can be represented together with the digital image—e.g. overlapping the latter.

Finally, a control signal for a control system of a surgery assistance system is determined, 208, which (i.e., the control signal and also the surgery assistance system) is usable during a microsurgical operation, wherein the control signal is ascertainable from the trustworthiness value—and optionally also by means of the probability value(s).

The machine learning system was trained beforehand with at least one first set of training data in the form of digital images of tissue which were recorded by a microsurgical device, together with associated annotation data. The annotation data contain information about an incidence of disease in each of the digital images. The training of the machine learning system had generated a machine learning model and associated parameter values. This is then suitable for a prediction of a probability value as to whether a diseased tissue region is present in at least one segment of a received digital image.

Moreover, the machine learning system having the machine learning model is suitable for making a prediction regarding a trustworthiness value indicating a trustworthiness of the machine learning model. From this trustworthiness value in turn—possibly in cooperation with the predicted probability values—a control signal for a control system of a surgery assistance system is derived, which is usable during performance of a microsurgical operation. By way of example, a subsystem of the surgery assistance system or some other system can be directly influenced.

Moreover, besides the probability value/s and the trustworthiness value regarding the machine learning system, additional outputs can be represented integrally with both the values mentioned. These can also be predicted—e.g. also by the same machine learning system. This could be a fluorescence image which was predicted from a white light recording, or else a tumor prediction from a traditional fluorescence image.

This gives rise to a distinctly improved handling possibility for the surgery assistance system since not only does the surgeon acquire information about the presence of tumorlike tissue and the exact position, but also the extent to which the surgeon can trust the machine learning system and the displays thereof is signaled to the surgeon. The surgeon can also be made aware of specific dangerous situations by way of particular optical and acoustic signals, which significantly improves the user interface of the surgery assistance system. Finally, the integrated representation results in improved assimilation of information by the surgeon, and so there is a better possibility of interaction with the system, i.e., an improvement of the "human-machine interface" (HMI), rather than exclusively a display of arbitrary information.

The representations can be vertical section representations or double representations (e.g. different colors) of the recording with trustworthiness values. Moreover—depending on the probability value for the presence of a tumor—different regions of the image can be represented differently on a monitor. Regions with different probability values can be represented with contrasting colors (or with different grayscale levels). This applies to all classes of surgery assistance systems.

FIG. 3 shows one exemplary embodiment of a transition of the trained machine learning model/s from the training mode 300 to a productive prediction mode 310.

The training mode has already been described in greater detail by way of FIG. 1. One or more sets of training data 302, 304 including the associated annotation as ground truth data are gradually introduced into the training process 306, by means of which the machine learning system 308 is trained to generate one or more machine learning models (not illustrated). Their parameter and optionally also hyperparameter values are finally stored. This machine learning system, or the associated learning models, is finally suitable for predicting one or a plurality of probability values P and one or a plurality of at least one trustworthiness value T (trust) of the machine learning system used.

This machine learning system 308 is then used in the productive prediction model 310 for active assistance of a surgeon during an operation or during a surgical intervention. For this purpose, the trained machine learning system 308 includes at least one image 312 fed to it from an image recording unit of a surgery assistance system, from which the probability values P and the trustworthiness value(s) T are then derived. These can be graphically represented, 314.

From the trustworthiness value T, moreover—optionally by way of further assistance of the probability values P—a control signal can be determined, 316, which can directly influence a control system of the surgery assistance system. One or more monitors for the graphical representation 314 can also be part of the surgery assistance system 318.

A number of examples for the use of the control signals have already been discussed above. Supplementations shall be presented at this juncture. Besides the already mentioned direct changes of the conditions for image recording during the operation, the control signal or a further generated control signal can also be used for storing the recorded and predicted data for retrospective evaluations and error analyses. An algorithm performance analysis, for example, can be based on this in order to clarify, for example, why the trustworthiness value T over a plurality of operations was relatively low.

Moreover, it is possible to enable the surgeon to be queried directly for the purpose of feedback and supplementing or improving the annotations, i.e., the ground truth data. A self-learning control loop can be created in this way. The above-described storage of the images recorded during the operation and the changed annotations can then be used for retraining the machine learning system.

The trustworthiness value can also be represented segment by segment or regionally on a recorded image or be superimposed on the current input image or a modified result image—for example a segmentation mask of the prediction (degree of alpha blending adjustable). Furthermore, a masking of regions in the represented result image is possible. Supplementarily, further text and information can be inserted on the represented result image of the integrated prediction.

FIG. 4 shows a possible set-up of the machine learning system 400 having a plurality of machine learning models 402, 404, . . . , 406. The plurality of machine learning systems can be based on the different sets of training data, on the one hand, or it is possible to change the hyperparameter values of the underlying machine learning system or else the training conditions. Input data fed in afterward—i.e., for example digital images from a surgical microscope—then also lead to slightly different prediction values for respective probability values P of the machine learning models 402, 404, . . . , 406. A mean value or average value 408 of the predicted probability values for a segment-by-segment tumor disease can correspond to the respective probability values P 410. On the other hand, the different predicted probability values, which typically differ from one another only slightly, can be fed to a function 412, which outputs as the result a variance value corresponding to the trustworthiness value T 414 of the entire machine learning system or of individual partial regions.

As already touched on briefly in connection with FIG. 4, from the trustworthiness value T (or a plurality thereof) and optionally with the assistance of the probability values P, at least one action 416 at a microsurgical device—e.g. surgery assistance system—can be initiated.

The different machine learning models 402, 404, . . . , 406 can stem from a plurality of different measures. They can largely be used both during training and during surgical operation:

Monte Carlo Dropout

Individual interim results—particularly in the case of a machine learning system that has already been trained—could be reset to ZERO according to a randomness principle. A standard deviation regarding the results could then be formed in order to determine a trustworthiness value. Alternative calculation bases are conceivable, such as min-max intervals, the variance or a quartile assessment.

Test-Time Augmentation

Ascertaining the prediction value(s) of an already trained machine learning model with the aid of input data randomly manipulated somewhat (artificially generated noise in the recorded images during productive operation).

Prediction of Distributions Over Pixel Intensities

In this case, the output of the machine learning system would not be a single numerical value per pixel, but rather a distribution over e.g. color values. This would also not necessitate a plurality of machine learning models.

Probability Models

In this case, the image-to-image (input vs. output) can be modeled with a probability family. It would thus become possible to generate different predictions for a given input image. The trustworthiness map could then again be supported on the basis thereof. This, too, would not necessitate a plurality of machine learning models.

Different Algorithmic Approaches for a Total Trustworthiness Value

For this purpose, some of the methods mentioned above would be used to generate therefrom a trustworthiness value for the entire prediction. This value could also be categorized by way of a configurable threshold value ("trustworthy"/"not trustworthy"). This would also not necessitate separate training.

Second Model for Predicting the Trustworthiness of a Digitally Stained Image

An artificially stained image—e.g. as output of a machine learning system—is also referred to as "stained image" in the technical jargon. In this regard, for example, from the grayscale image from the confocal endomicroscope, it is possible to generate/predict a color image that is similar to the H&E images (from hematoxylin and eosin staining) in pathology. This makes it easier to interpret images better and more simply or to establish a finding.

In this example, therefore, the first machine learning model would predict a color image 12 from a grayscale image 11.

The trustworthiness value used would be the output of a second machine learning model, which was trained as a binary classifier, receives 11 and 12 as input and yields as output the probability that 11 and 12 are correlated. In this case, the second machine learning model can be trained as follows:

A training pair 11 (greyscale image) and 12 (color image as annotation) receives the label "1". In order to generate the "0" labels, the 12 image is disassociated or replaced by other off-domain images.

Use of Activations in Respect of an Adapted Digitally Stained Image

Here it would be possible to use a "self-attention block architecture" for an image-to-image model. "Attention values" which would be established as a second model would be used for this purpose, in which case the activations of the first model would then be usable. Such a procedure would only be usable, however, if "self-attention layers" were present in the machine learning model.

FIG. 5 shows one exemplary embodiment of a generic use scenario 500 for a surgery assistance system. This illustration also serves as a basis for the subsequent illustrations in FIGS. 6 and 7. A surgical microscope 502 generates a digital image 504 (the image can also originate from an endomicroscope, for example), which is fed to the trained machine learning system 308. A signal 506 for a control system of a surgery assistance system 508 or a microsurgical device is then generated from the probability values P and the trustworthiness value T. A graphical output 510 is additionally effected, which can represent different probability values P for a tumor disease in different colors or grayscale levels. A segment-by-segment trustworthiness value T, which can apply to the entire image, can additionally be represented in an overlapping fashion.

FIG. 6 shows 2 different exemplary embodiments 600, 650 for different practical implementations. In the case of the exemplary embodiment 600, a camera of a surgical microscope 502 (cf. FIG. 5) is used to generate a white light image 602. After the use of this recording as input signal/input signals by the trained machine learning system 308, the probability values P and trustworthiness value(s) T are predicted. There are various possibilities for the representation at this point. Firstly, it is possible here, too, to present a virtual BLUE400 representation 604—either as an alternative to or in parallel with the white light image. The BLUE400 representation 604 was expediently learned by the machine learning system. Overlapping these representations, a trustworthiness map 606 (uncertainty map) can be represented, e.g. by uncertainty values regarding the predictions of the machine learning system being used alternatively instead of the trustworthiness values. Other surgery assistance systems may use other image recording systems.

In the case of the exemplary embodiment 650, in which a corresponding optical system feeds a fluorescence image 652 to the trained machine learning system 308 as input data, the corresponding screen representation 654, 656 can present an indication of a determination "tumor yes/no" and of an uncertainty rating for this determination.

FIG. 7 shows one exemplary embodiment of the training system 700 for training a machine learning system for a differentiation between healthy and diseased tissue during a microsurgical intervention.

In this case, the training system 700 comprises a memory 706 for at least one first set of training data in the form of digital images of tissue which were recorded by a microsurgical device (not illustrated), together with associated annotation data for training the machine learning system 708, wherein the annotation data comprise information about an incidence of disease in each of the digital images.

The training system 700 furthermore comprises a machine learning system 708, which is trainable with the at least first set of training data in order to generate a machine learning model.

Moreover, the training system 700 comprises a processor 702 and a memory 704 operatively connected to the processor 702, wherein the memory 704 stores instructions that cause the processor 702 to train the machine learning system 708 (cf. FIG. 3, 308) with the at least first set of training data in order to generate a machine learning model. After training, the machine learning model is then configured for a prediction of a probability value which indicates whether a diseased tissue region is present in at least one segment of a received digital image. Moreover, the machine learning model enables a prediction of a trustworthiness value indicative of a trustworthiness of the machine learning model 708, from which a control signal is derivable—in particular by means of a control signal generator 714 for a surgery assistance system. Said control signal can be usable during a later application during a microsurgical operation. Moreover, the training system 700 comprises a parameter value memory 712 for data of the trained machine learning model.

All sub-elements of the training system 700—in particular the processor 702, the memory 704, the memory for training data sets 706, the machine learning system 708, a supervisory and control system 710 for the machine learning system 708, the parameter value memory and the control signal generator 714—can be connected to one another either in each case directly or via the bus system 716 for the purpose of data exchange.

FIG. 8 shows one exemplary embodiment of parts of the surgery assistance system 800 having a machine learning system 810 for a differentiation between healthy and diseased tissue during a microsurgical intervention. In this case, the surgery assistance system 800 can comprise the following: an image recording system 806 of a microsurgical device for recording a digital image, wherein the digital image represents tissue. The image recording system 806 (e.g. a camera, a scanner, . . . ) can be identical with one of the image recording systems illustrated in the other figures.

The surgery assistance system 800 also comprises a trained machine learning system 810 comprising at least one machine learning model which is adapted for predicting a probability value indicative of whether a diseased tissue region is present in at least one segment of the recorded digital image. The trained machine learning system 810 can be controlled in terms of its execution by a supervisory system 808. In this case, the machine learning system 810 having the at least one machine learning model is also adapted for predicting a trustworthiness value indicative of a trustworthiness of the prediction of the probability value.

The surgery assistance system 800 additionally comprises a control signal generator 812 for a subsystem of a surgery assistance system which is usable during a microsurgical operation, wherein the control signal is ascertained by means of the trustworthiness value.

As already mentioned, the machine learning system 810 was trained with at least one first set of training data in the form of digital images of tissue which were recorded by a microsurgical device, together with associated annotation data. In this case, the annotation data contain information about an incidence of disease in each of the digital images. Finally, the training of the machine learning system has led to a machine learning model (or a plurality thereof) and associated parameter values, resulting in a prediction of a probability value indicative of whether a diseased tissue region is present in at least one segment of a received digital image, and a prediction of a trustworthiness value indicative of a trustworthiness of the machine learning model, from which a control signal for a control system of a surgery assistance system is derivable, which is usable during an application during a microsurgical operation.

Express reference is made to the fact that the modules and units—in particular the processor 802, the memory 804, the image recording system 806, the supervisory system 808, the machine learning system 810 and the control signal generator 812—can be connected to electrical signal lines or via a system-internal bus system 814 for the purpose of exchanging signals or data.

The computer system 900 has a plurality of general-purpose functions. The computer system may in this case be a tablet computer, a laptop/notebook computer, some other portable or mobile electronic device, a microprocessor system, a microprocessor-based system, a smartphone, a computer system with specially configured special functions, or else a constituent part of a microscope system. The computer system 900 may be configured so as to execute computer system-executable instructions—such as for example program modules—that may be executed in order to implement functions of the concepts proposed here. For this purpose, the program modules may comprise routines, programs, objects, components, logic, data structures etc. in order to implement particular tasks or particular abstract data types.

The components of the computer system may comprise the following: one or more processors or processing units 902, a storage system 904 and a bus system 906 that connects various system components, including the storage system 904, to the processor 902. The computer system 900 typically comprises a plurality of volatile or non-volatile storage media accessible by the computer system 900. The storage system 904 may store the data and/or instructions (commands) of the storage media in volatile form—such as for example in a RAM (random access memory) 908—in order to be executed by the processor 902. These data and instructions realize one or more functions and/or steps of the concept presented here. Further components of the storage system 904 may be a permanent memory (ROM) 910 and a long-term memory 912, in which the program modules and data (reference sign 916) and also workflows may be stored.

The computer system comprises a number of dedicated devices (keyboard 918, mouse/pointing device (not illustrated), screen 920, etc.) for communication purposes. These dedicated devices may also be combined in a touch-sensitive display. An I/O controller 914, provided separately, ensures a frictionless exchange of data with external devices. A network adapter 922 is available for communication via a local or global network (LAN, WAN, for example via the Internet). The network adapter may be accessed by other components of the computer system 900 via the bus system 906. It is understood in this case, although it is not illustrated, that other devices may also be connected to the computer system 900.

In addition, at least parts of the training system for training a machine learning system for a differentiation between healthy and diseased tissue during a microsurgical intervention and also the corresponding surgical system/surgery assistance system 800 or parts and individual controllers may be connected to the bus system 906.

The description of the various exemplary embodiments of the present disclosure has been given for the purpose of improved understanding, but does not serve to directly restrict the inventive concept to these exemplary embodiments. A person skilled in the art will himself/herself develop further modifications and variations. The terminology used here has been selected so as to best describe the basic principles of the exemplary embodiments and to make them easily accessible to a person skilled in the art.

The principle presented here may be embodied as a system, as a method, combinations thereof and/or else as a computer program product. The computer program product may in this case comprise one (or more) computer-readable storage medium/media comprising computer-readable program instructions in order to cause a processor or a control system to implement various aspects of the present disclosure.

As media, electronic, magnetic, optical, electromagnetic or infrared media or semiconductor systems are used as forwarding medium; for example SSDs (solid state devices/drives as solid state memory), RAM (random access memory) and/or ROM (read-only memory), EEPROM (electrically erasable ROM) or any combination thereof. Suitable forwarding media also include propagating electromagnetic waves, electromagnetic waves in waveguides or other transmission media (for example light pulses in optical cables) or electrical signals transmitted in wires.

The computer-readable storage medium may be an embodying device that retains or stores instructions for use by an instruction execution device. The computer-readable program instructions that are described here may also be downloaded onto a corresponding computer system, for example as a (smartphone) app from a service provider via a cable-based connection or a mobile radio network.

The computer-readable program instructions for executing operations of the disclosure described here may be machine-dependent or machine-independent instructions, microcode, firmware, status-defining data or any source code or object code that is written for example in C++, Java or the like or in conventional procedural programming languages such as for example the programming language "C" or similar programming languages. The computer-readable program instructions may be executed in full by a computer system. In some exemplary embodiments, there may also be electronic circuits, such as, for example, programmable logic circuits, field-programmable gate arrays (FPGAs) or programmable logic arrays (PLAs), which execute the computer-readable program instructions by using status information of the computer-readable program instructions in order to configure or to individualize the electronic circuits according to aspects of the present disclosure.

The disclosure presented here is furthermore illustrated with reference to flowcharts and/or block diagrams of methods, devices (systems) and computer program products according to exemplary embodiments of the disclosure. It should be pointed out that practically any block of the flowcharts and/or block diagrams can be embodied as computer-readable program instructions.

The computer-readable program instructions may be made available to a general-purpose computer, a special computer or a data processing system able to be programmed in another way in order to create a machine such that the instructions that are executed by the processor or the computer or other programmable data processing devices generate means for implementing the functions or procedures that are illustrated in the flowchart and/or block diagrams. These computer-readable program instructions can correspondingly also be stored on a computer-readable storage medium.

In this sense, any block in the illustrated flowchart or the block diagrams may represent a module, a segment or portions of instructions that represent a plurality of executable instructions for implementing the specific logic function. In some exemplary embodiments, the functions represented in the individual blocks can be implemented in a different order—optionally also in parallel.

The illustrated structures, materials, sequences, and equivalents of all of the means and/or steps with associated functions in the claims below are intended to apply all of the structures, materials or sequences as expressed by the claims.

The invention claimed is:

1. A computer-implemented method for training a machine learning system for a differentiation between healthy and diseased tissue during a microsurgical intervention, wherein the method comprises:
receiving at least one first set of training data in form of digital images of tissue which were recorded by a microsurgical device, together with associated annotation data for training a machine learning system, wherein the annotation data comprise information about an incidence of disease in each of the digital images,
training the machine learning system with the at least first set of training data in order to generate a machine learning model which after training is configured for
a prediction of a probability value (P) indicative of whether a diseased tissue region is present in at least one segment of a received digital image,
a prediction of a trustworthiness value (T) indicative of a trustworthiness of the machine learning model, from which:
a control signal for a surgery assistance system is derivable, which is usable during a later application during a microsurgical operation, and
storing parameter values of the trained machine learning model.

2. The method as claimed in claim 1, wherein the at least first set of digital images comprises a plurality of at least partly different sets of training data, from which a plurality of machine learning models are generated and/or stored by way of the training.

3. The method as claimed in claim 2, wherein the prediction of the trustworthiness value (T) comprises:
generating a plurality of probability values (P) for the presence of a diseased tissue region by means of the plurality of machine learning models, and
determining a function value for a function comprising the plurality of probability values (P) as argument, wherein the trustworthiness value (T) is based on the function value.

4. The method as claimed in claim 3, furthermore comprising:
determining a variance value by way of the function constituted by the plurality of probability values, wherein the variance value represents the trustworthiness value (T).

5. The method as claimed in claim 1, wherein training the machine learning system with the at least first set of digital images additionally comprises:
retraining the machine learning system with the at least first set of digital images, wherein hyperparameter values of the machine learning system differ between the original training and the retraining, as a result of which a plurality of machine learning models are generated and/or stored.

6. The method as claimed in claim 1, wherein the machine learning system is a neural network.

7. The method as claimed in claim 1, wherein the digital images of tissue were recorded by means of an image recording system of a surgical microscope, of a confocal endomicroscope or of a micro-inspection tool.

8. A computer program product for differentiation between healthy and diseased tissue during a microsurgical intervention, wherein the computer program product comprises a computer-readable storage medium comprising program instructions stored thereon, wherein the program instructions are executable by one or more computers or control units and cause said one or more computers or control units to carry out the method according to claim 1.

9. A computer-implemented method for a differentiation between healthy and diseased tissue during a microsurgical intervention, wherein the method comprises:
receiving a digital image from a microsurgical device, wherein the digital image represents tissue,
predicting, by means of a trained machine learning system, a probability value (P) indicative of whether a diseased tissue region is present in at least one segment of the received digital image,
predicting, by means of the trained machine learning system, a trustworthiness value (T) indicative of a trustworthiness of the prediction of the probability value (P),
determining a control signal for a control system of a surgery assistance system which is usable during a microsurgical operation, wherein the control signal is ascertainable by means of the trustworthiness value (T),
wherein the machine learning system was trained with at least one first set of training data in form of digital images of tissue which were recorded by a microsurgical device, together with associated annotation data, wherein the annotation data comprise information about an incidence of disease in each of the digital images, and wherein the training of the machine learning system comprises a machine learning model and associated parameter values for:
a prediction of a probability value (P) indicative of whether a diseased tissue region is present in at least one segment of a received digital image,
a prediction of a trustworthiness value (T) indicative of a trustworthiness of the machine learning model, from which a control signal for a control system of a surgery assistance system is derivable, which is usable during an application during a microsurgical operation.

10. The method as claimed in claim 9, wherein the machine learning system comprises a plurality of machine learning models.

11. The method as claimed in claim 10, wherein the prediction of the trustworthiness value (T) comprises:
predicting a plurality of probability values for the presence of a diseased tissue region by means of the plurality of machine learning models, and
predicting a function value for a function comprising the plurality of probability values as argument, wherein the trustworthiness value (T) is based on the function value.

12. The method as claimed in claim 11, furthermore comprising:
determining a variance value by way of the function constituted by the plurality of probability values (P), wherein the variance value represents the trustworthiness value (T).

13. The method as claimed in claim 9, wherein the control signal for a surgery assistance system is at least one selected from the group comprising:
a visual warning signal for a trustworthiness value (T) that is lower than a first threshold value;
an acoustic warning signal for a trustworthiness value (T) that is lower than a second threshold value;

a control signal for changing a system state of the surgery assistance system; and a control signal for initiating a changed recording mode for the digital image.

14. A training system for training a machine learning system for a differentiation between healthy and diseased tissue during a microsurgical intervention, wherein the training system comprises:
- a memory for at least one first set of training data in form of digital images of tissue which were recorded by a microsurgical device, together with associated annotation data for training a machine learning system, wherein the annotation data comprise information about an incidence of disease in each of the digital images,
- the machine learning system, which is trainable with the at least first set of training data in order to generate a machine learning model,
- a processor and a memory operatively connected to the processor, wherein the memory stores instructions that cause the processor to
  train the machine learning system with the at least first set of training data in order to generate a machine learning model which after training is configured for
  a prediction of a probability value (P) indicative of whether a diseased tissue region is present in at least one segment of a received digital image,
  a prediction of a trustworthiness value (T) indicative of a trustworthiness of the machine learning model, from which:
    a control signal for a surgery assistance system is derivable, which is usable during a later application during a microsurgical operation, and
    a memory for parameter values of the trained machine learning model.

15. A surgery assistance system for a differentiation between healthy and diseased tissue during a microsurgical intervention, wherein the surgery assistance system comprises:
- an image recording system of a microsurgical device for recording a digital image, wherein the digital image represents tissue,
- a trained machine learning system comprising a machine learning model which is adapted for predicting a probability value (P) indicative of whether a diseased tissue region is present in at least one segment of the recorded digital image,
- wherein the machine learning system having the machine learning model is also adapted for predicting a trustworthiness value (T) indicative of a trustworthiness of the prediction of the probability value (P),
- a control signal generator for a surgery assistance system (416) which is usable during a microsurgical operation, wherein the control signal is ascertainable by means of the trustworthiness value (T),
- wherein the machine learning system was trained with at least one first set of training data in form of digital images of tissue which were recorded by a microsurgical device, together with associated annotation data, wherein the annotation data comprise information about an incidence of disease in each of the digital images, and wherein the training of the machine learning system comprises a machine learning model and associated parameter values for:
  a prediction of a probability value (P) indicative of whether a diseased tissue region is present in at least one segment of a received digital image, and
  a prediction of a trustworthiness value (T) indicative of a trustworthiness of the machine learning model, from which a control signal for a control system of a surgery assistance system is derivable, which is usable during an application during a microsurgical operation.

* * * * *